B. A. REIF.
MOTOR PROPELLED VEHICLE.
APPLICATION FILED DEC. 26, 1916.

1,296,216.

Patented Mar. 4, 1919.
4 SHEETS—SHEET 1.

WITNESSES:
Martin H. Olsen.
Edna A. Olaison.

INVENTOR.
Bernard A. Reif
BY
ATTORNEY.

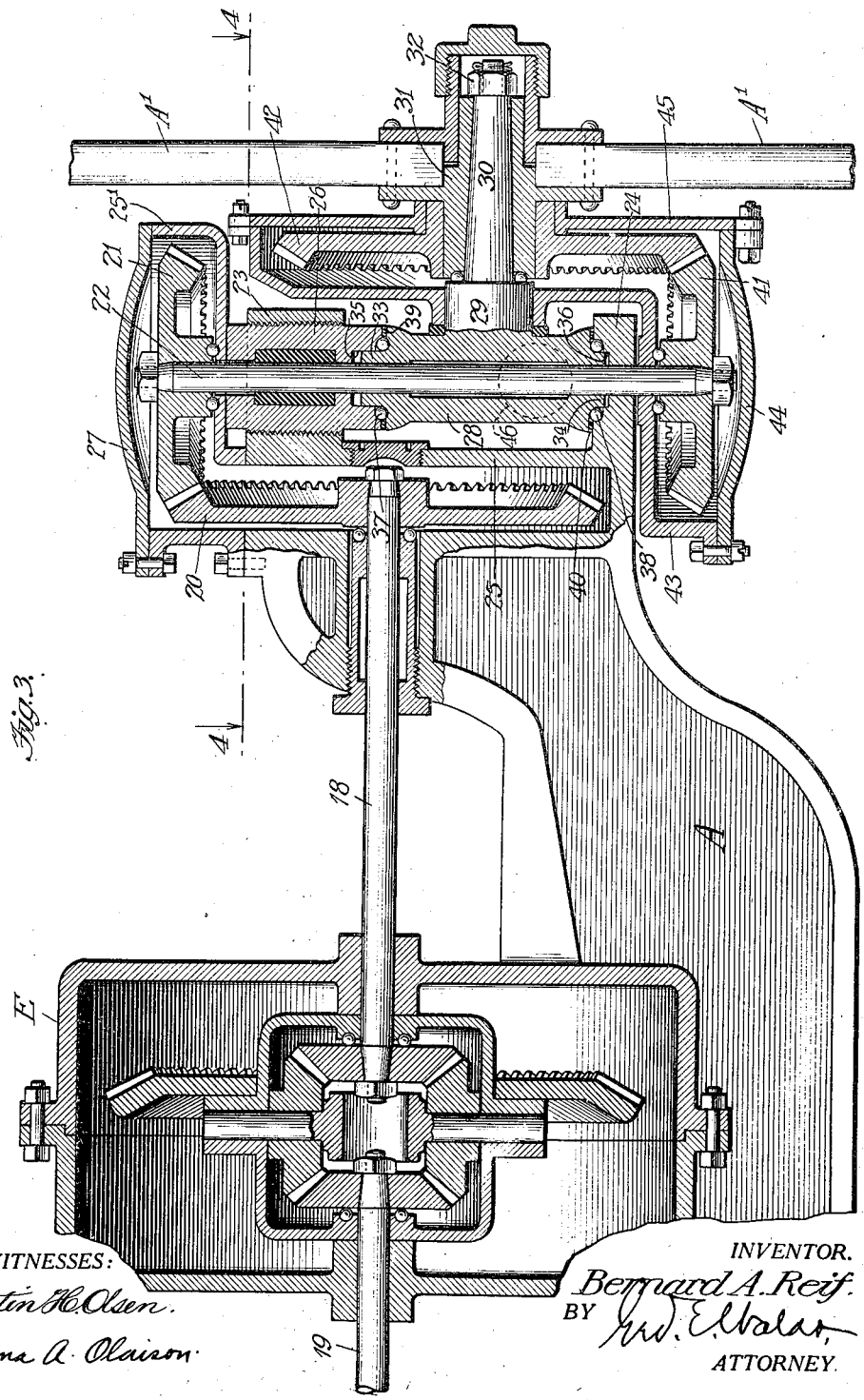

B. A. REIF.
MOTOR PROPELLED VEHICLE.
APPLICATION FILED DEC. 26, 1916.
1,296,216.
Patented Mar. 4, 1919.
4 SHEETS—SHEET 3.
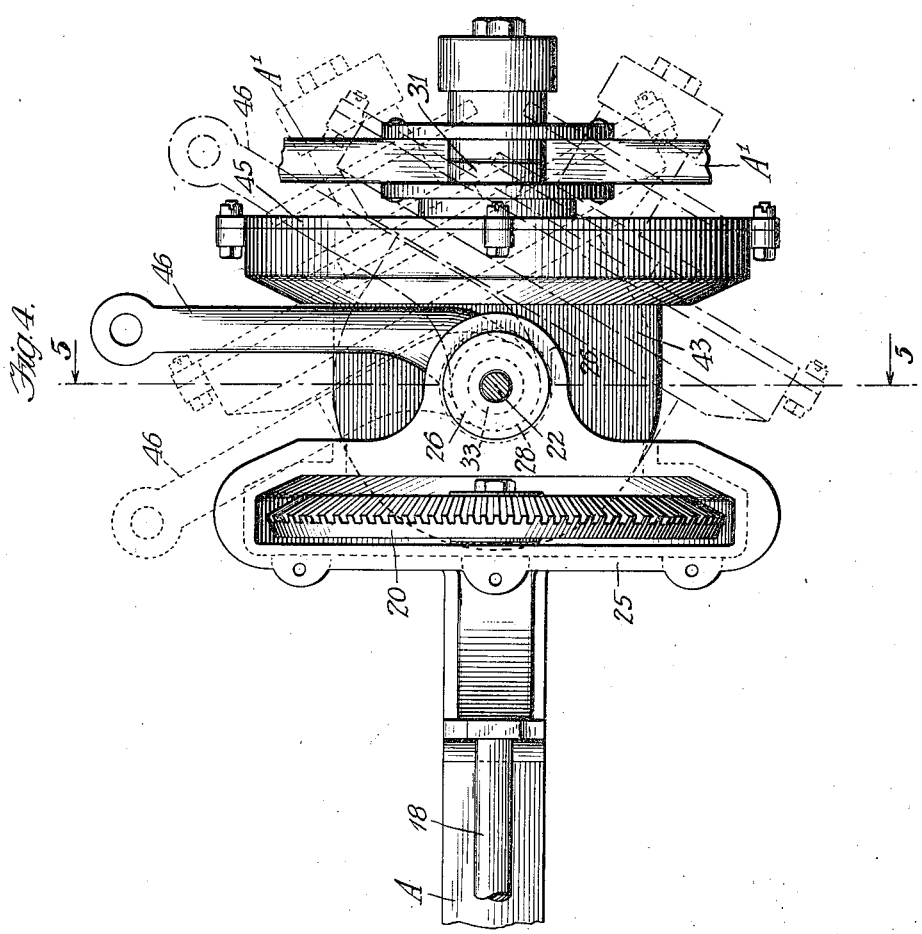
WITNESSES:
Martin H. Olsen.
Edna A. Olaison.
INVENTOR.
Bernard A. Reif.
BY
ATTORNEY.

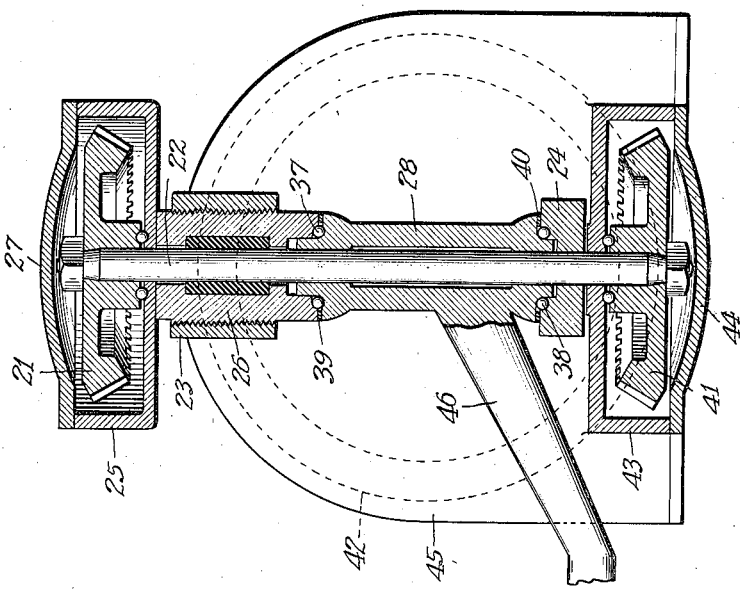
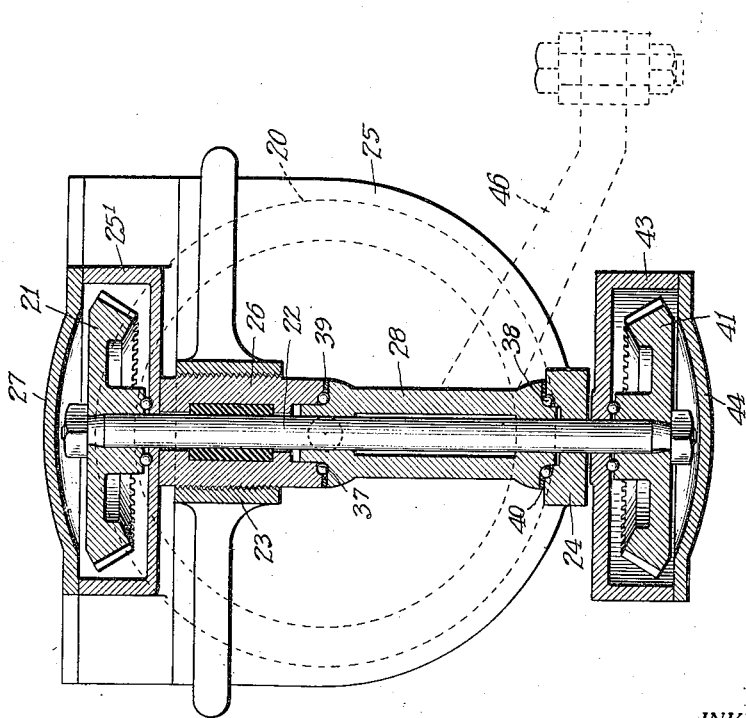

UNITED STATES PATENT OFFICE.

BERNARD A. REIF, OF CODY, WYOMING.

MOTOR-PROPELLED VEHICLE.

1,296,216.                    Specification of Letters Patent.           Patented Mar. 4, 1919.

Application filed December 26, 1916. Serial No. 138,921.

*To all whom it may concern:*

Be it known that I, BERNARD A. REIF, a citizen of the United States, and resident of Cody, in the county of Park and State of Wyoming, have invented a new and useful Motor-Propelled Vehicle, of which the following is a specification.

This invention relates to motor propelled vehicles and relates particularly to propelling mechanism therefor of the type commonly known as a four-wheel drive.

The object of the invention is to provide an improved four-wheel drive for motor vehicles which shall be simple in construction, strong, durable and effective for its designed purpose.

A further object of the invention is to provide an improved casing for the gear for driving the front wheels of the vehicle, whereby access of dirt to said gearing will be prevented and whereby, also, it is rendered possible to run said gears in oil.

To effect the objects of my invention, a driving mechanism of my invention comprises the various features, combinations of features and details of construction hereinafter described and claimed.

In the accompanying drawings, in which my invention is fully illustrated,

Fig. 3 is a combined side elevation and vertical sectional view of the differential gear for driving the front wheels of the vehicle and of the gearing by which the front wheels are driven from said differential.

Fig. 4 is a sectional, top plan view of the driving gear for the front wheel on the line 4—4 of Fig. 3, the steering member of said gearing being shown, in dotted lines, turned into different positions which it will assume in steering the car; and Figs. 5 and 6 are sectional elevations both taken on the line 5—5 of Fig. 4, Fig. 5 looking in the direction indicated by the arrows and Fig. 6 in the opposite direction.

Figure 1:
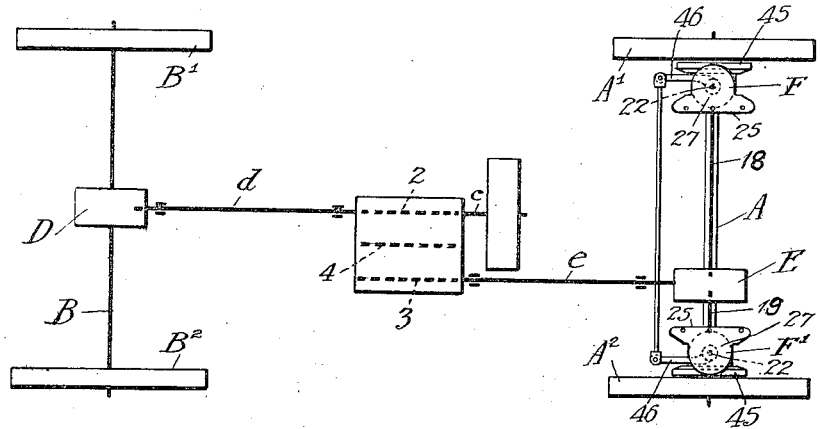
Figure 1 is a diagrammatic view showing the general lay-out of a propelling mechanism for motor vehicles of my invention.

In Fig. 1, in which I have shown, in diagram, a typical lay-out for a four-wheel drive of my invention, A designates the front axle A', A² the front wheels, B the rear axle, B', B² the rear wheels, C the transmission gearing through which the power from the engine is transmitted to both the front and rear axles, $c$ the engine shaft, D the differential gearing for driving the rear axle which is driven from the transmission C by means of the transmission shaft $d$, E the differential gearing for driving the front axle which is driven from the transmission C by means of the transmission shaft $e$; and F, F' the gearing for driving the front wheels A', A², respectively, and which are driven from the differential E in the manner presently described.

With the exception of the gearing F, F' for driving the front wheels and the specific transmission C, all of the foregoing parts are old and well known in the art and may be of any desired or approved construction. Persons skilled in the art can readily supply said parts and they need not, therefore, be described in detail.

Figure 2:
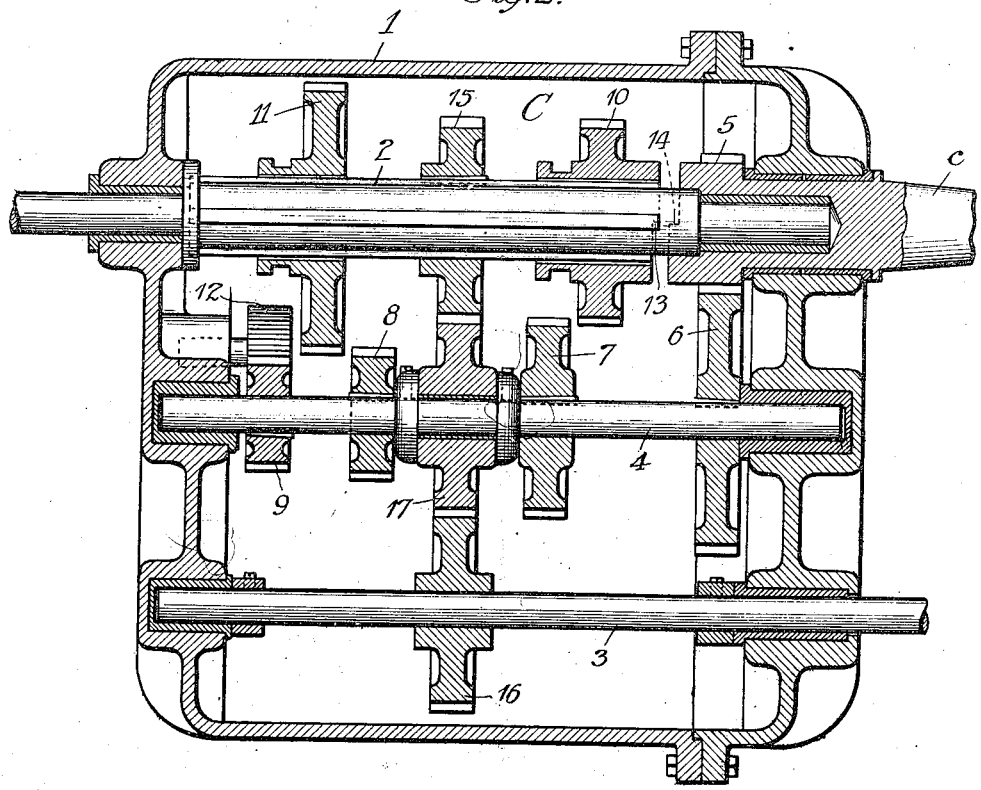
Fig. 2 is a horizontal, sectional, plan view of a perferred form of transmission gearing forming part of my improved propelling mechanism.

The transmission gearing C may likewise be of any desired or approved construction, what I now consider the preferable form thereof being that shown and described in Fig. 2 of the drawings, and which I will now describe.

The operative parts of said gearing are inclosed in a suitable casing 1 which is adapted to be rigidly secured to the chassis of the vehicle and which forms the frame in which the parts of the gearing are operatively mounted.

Rotatably mounted in suitable bearings in the casing 1, are shafts 2, 3 and 4, the transmission shaft $d$ for the rear axle being coupled directly to the shaft 2, the transmission shaft $e$ for the front axle being coupled directly to the shaft 3, and the shaft 4 being mounted intermediate said shafts 2 and 3. As shown, also, the shaft 2 is in alinement with the engine shaft $c$, the bearing for said shaft 2, as shown, being formed directly in the end of said engine shaft.

The shafts 2 and 3 are driven from the engine shaft $c$ either directly or through suitable gearing. As shown, said gearing comprises spur gears 5 and 6 secured to rotate with the engine shaft $c$ and with the shaft 4, respectively, gears 7, 8 and 9 secured to the shaft 4 so as to rotate therewith, and gears 10 and 11 splined to the shaft 2, the gear 10 being adapted to be shifted endwise of the shaft 2 to cause the teeth thereof to intermesh with the teeth of the gear 7 on the shaft 4, and the gear 11 being adapted to be shifted endwise on the shaft 2 to effect engagement thereof with the gear 8 and with an intermediate idle gear 12 which also meshes with the gear 9. The gear 10 is also provided on the face of its hub adjacent to the gear 5 with a shoulder 13 which is adapted to engage a corresponding shoulder 14 formed on the adjacent end of the engine shaft c, endwise movement of said gear 10 in the proper direction operating to effect engagement of said shoulders 13 and 14, which thus form a clutch providing direct driving connection between the engine shaft c and said gear 10 and thus the shaft 2.

Rotation of the shaft 2 is imparted to the shaft 3 by means of gears 15 and 16 secured to rotate with said shafts respectively, and with an intermediate gear 17 mounted to turn freely on the intermediate shaft 4, the relation being preferably such that said shafts 2 and 3 will be driven at substantially the same rate of speed.

Engagement of the clutch shoulders 13 and 14 effects maximum or high speed of the transmission shafts d and e and thus of the vehicle, engagement of the gears 7 and 10 intermediate speed, of the gears 8 and 11 low speed, while engagement of the gears 9, 11 and 12 effects reverse movement of the transmission shafts, and thus backward movement of the vehicle, all in a usual manner.

While I consider the form of transmission herein shown and described as desirable and preferable, I do not wish to limit myself thereto, as other forms of transmission available for the purpose will readily suggest themselves to persons skilled in the art.

The principal feature of novelty of my improved vehicle propelling mechanism resides in the gearing for driving the front wheels A', A² which I will now describe. As the gearing for driving either front wheel is a duplicate of the gearing for driving the other, a description of one thereof will apply equally to the other, and the accompanying description is, accordingly, in the singular, being limited to a description of the gearing for driving one of said wheels.

Power from the differential E is transmitted to the gearing for driving the front wheels through a shaft comprising separate sections 18 and 19 which respectively transmit power from the differential E to the gearing for driving the front wheels A', A², the sections of said shaft being rotatably mounted in suitable bearings formed in the differential casing and in the front axle A. As shown, the shaft section 18 is shown as applied for driving the gearing F applied to the wheel A', to which the following description will be limited.

Secured to the outer end of the shaft section 18 which projects through the bearing on the axle A, is a bevel gear 20 which meshes with a bevel gear 21 secured to an upright shaft 22 rotatably mounted in suitable bearings in lugs or bosses 23 and 24 forming part of a housing 25 formed on or rigidly secured to the outer end of the axle A and which forms a tight casing inclosing the gears 20 and 21 and is adapted to contain a quantity of machine oil for lubricating said gears.

For reasons presently apparent, the bearing for the shaft 22 in the lug or boss 23 is formed directly in a nut 26 threaded into a hole formed through said lug or boss 23 concentric with said shaft 22. Also, in order that the portion of the housing 25 which incloses the gear 21 shall not interfere with inserting the nut 26 into the hole in the boss 23 and removing the same therefrom, if desired, said housing comprises an upper removable section 25' which is bolted or otherwise secured to the lower fixed section 25. To provide access to the interior of the removable housing section 25' for inserting the bevel gear 21 therein and removing it therefrom, the top of said housing section 25' is closed by means of a cap or cover 27 removably secured thereto by means of bolts, screws or the like.

Rotatably mounted in suitable bearings in the lower end of the nut 26 and the upper side of the lower lug or boss 24 is the steering knuckle 28 formed on which is a laterally extending boss 29 which terminates in a journal 30 on which the wheel A' is rotatably mounted, the hub 31 of said wheel being provided with a bearing to which the journal 30 is fitted and said wheel being secured in position on said journal by means of a nut 32 threaded to a reduced axial extension of said journal. Said steering knuckle is provided with an axial bore through which the shaft 22 extends.

With the described construction, it is obvious that the steering knuckle 28, the boss 29 and the journal 30 will sustain the entire load carried by the wheel A' and, in order that the strains due to such load shall be transmitted directly to the housing 25 on the axle A, said steering knuckle 28 is supported by means of reduced axial extensions 33 and 34 on the upper and lower ends thereof, respectively, which are fitted to corresponding recessed bearings 35 and 36 formed in the nut 26 and in the lower lug or boss 24 on the housing 25, respectively. Also, said steering knuckle 28 is provided at its ends with anti-friction bearings, as shown ball bearings 37 and 38, which will permit the steering knuckle 28 to turn freely regardless of the load which it sustains.

The nut 26 affords convenient means for effecting engagement and disengagement of the interlocking bearing projections 33 and 34 with the recessed bearings 35 and 36 and for adjusting and taking up wear of the anti-friction bearings 37 and 38. Also, to prevent access of dirt and grit to said bearings 37 and 38, the space between the ends of the steering knuckle 28 and the opposed surfaces of the nut 26 and of the lug or boss 24 on the housing 25, outside of said bearings 37 and 38, is rendered dust and dirt proof by means of suitable packing rings shown at 39 and 40.

The wheel A' is driven from the shaft 22 by means of bevel gears 41 and 42 secured to the lower end of the shaft 22 and to the hub 31 of the wheel A', respectively.

Said gears 41 and 42 are inclosed in a suitable tight casing adapted to exclude dirt and grit from said gears and which provides for running said gears in oil to reduce wear thereof. As shown, said casing comprises what may be termed a body portion 43, provided with bearings for the shaft 22 and the boss 29 on the steering knuckle 28 so as to be supported thereby, the lower side 44 and the outer side 45 of said casing being preferably removable to provide for assembling and removing said casing and to render the interior thereof accessible if for any reason desired. The outer wall 45 of said casing is provided with a bearing to which the hub of the gear 42 is fitted so as to turn freely therein and at the same time form a tight joint.

With the described construction, it is obvious that the steering knuckle 28 which carries the journal 30 will be free to turn axially to provide for steering the vehicle, as shown in Fig. 4, and formed on said steering knuckle is an arm 46 adapted to be connected to the steering gear in a usual manner.

I claim:—

1. In a motor propelled vehicle, the combination of an axle, a driven shaft having a bearing in said axle, a housing on said axle, a steering knuckle provided with an axial bore mounted in bearings in said housing so as to be rotatable about an upright axis, said steering knuckle comprising a steering arm and a journal, a vehicle wheel rotatably mounted on said journal, driving connection between said driven shaft and vehicle wheel, comprising an upright shaft rotatably mounted in bearings formed in the housing on said axle and which extends through the bore in said steering knuckle, and bevel gears secured to the driven shaft and to the vehicle wheel and which intermesh, respectively, with bevel gears secured to said upright shaft, the housing on the axle forming a casing which incloses the gear on the driven shaft and the gear on the upright shaft which meshes therewith, and a separate casing supported on said upright shaft and on the steering knuckle, which incloses the gear on the vehicle wheel and the gear on the upright shaft which meshes therewith, substantially as described.

2. In a motor propelled vehicle, the combination of an axle, a driven shaft having a bearing in said axle, a housing on said axle, a steering knuckle provided with an axial bore mounted in bearings in said housing so as to be rotatable about an upright axis, said steering knuckle comprising a steering arm and a journal, a vehicle wheel rotatably mounted on said journal, driving connection between said driven shaft and vehicle wheel, comprising an upright shaft rotatably mounted in bearings formed in the housing on said axle and which extends through the bore in said steering knuckle, and bevel gears secured to the driven shaft and to the vehicle wheel and which intermesh, respectively, with bevel gears secured to said upright shaft, the housing on the axle forming the body portion of a casing which incloses the gear secured to the driven shaft and the gear on said upright shaft which meshes therewith, said casing being provided with an opening through which said gears may be assembled therein, and a removable cover therefor, and a separate casing which incloses the gear secured to the vehicle wheel and the gear on the upright shaft which meshes therewith, said second casing being provided at one side of the gear secured to the vehicle wheel with a bearing fitted to a corresponding bearing formed on the steering knuckle at the inner end of the journal thereon and at the opposite side of said gear with a bearing for a part rotatable with the vehicle wheel and being also provided with a bearing for the upright shaft, said casing comprising removable sides to provide for assembling the gears contained therein, substantially as described.

3. In a motor propelled vehicle, the combination of an axle, a driven shaft having a bearing in said axle, a housing on said axle, a steering knuckle provided with an axial bore mounted in bearings in said housing so as to be rotatable about an upright axis, said steering knuckle comprising a steering arm and a journal, a vehicle wheel rotatably mounted on said journal, driving connection between said driven shaft and vehicle wheel, comprising an upright shaft rotatably mounted in bearings formed in the housing on said axle and which extends through the bore in said steering knuckle, and bevel gears secured to the driven shaft and to the vehicle wheel and which intermesh, respectively, with bevel gears secured to said upright shaft, the housing on the axle forming the body portion of a casing which incloses the gear secured to the driven shaft and the gear on said upright shaft which meshes therewith, said casing being provided with an opening through which said gears may be assembled therein, and a removable cover therefor, and said housing also comprising external lugs provided with bearings for said upright shaft, and a separate casing which incloses the gear secured to the vehicle wheel and the gear on the upright shaft which meshes therewith, said second casing being provided at one side of the gear secured to the vehicle wheel with a bearing fitted to a corresponding bearing formed on the steering knuckle at the inner end of the journal thereon and at the opposite side of said gear with a bearing for a part rotatable with the vehicle wheel and being also provided with a bearing for the upright shaft, said casing comprising removable sides to provide for assembling the gears contained therein, substantially as described.

4. In a motor propelled vehicle, the combination of an axle, a driven shaft having a bearing in said axle, a housing on said axle, a steering knuckle provided with an axial bore mounted in bearings in said housing so as to be rotatable about an upright axis, said steering knuckle comprising a steering arm and a journal, a vehicle wheel rotatably mounted on said journal, driving connection between said driven shaft and said vehicle wheel, comprising an upright shaft rotatably mounted in bearings in the housing on said axle and which extends through the bore in said steering knuckle, and bevel gears secured to the driven shaft and to the vehicle wheel and which intermesh, respectively, with bevel gears secured to said upright shaft, the bearings for said steering knuckle comprising interlocking axial projections and recessed bearings to which said bearing projections are fitted, engagement and disengagement of which are adapted to be effected by relative endwise movement thereof, one of said bearings being formed on a nut threaded to a hole in the housing on said axle to provide necessary relative endwise movement of said interlocking bearings to effect engagement and disengagement thereof, the housing on the axle forming the body portion of a casing which incloses the bevel gear secured to the driven shaft and the bevel gear secured to the upright shaft which meshes therewith, said casing being provided with an opening through which said gears may be assembled therein, and a removable cover therefor, and a separate casing which incloses the gear secured to the vehicle wheel and the gear on the upright shaft which meshes therewith, the section of the casing which incloses the bevel gear on the upright shaft adjacent to said bearing nut being removable to render said bearing nut accessible for manipulation, substantially as described.

In testimony, that I claim the foregoing as my invention, I affix my signature this 11th day of December 1916.

BERNARD A. REIF.